(12) United States Patent
Matsuki et al.

(10) Patent No.: US 11,019,315 B2
(45) Date of Patent: May 25, 2021

(54) VIDEO DISPLAY SYSTEM

(71) Applicant: Panasonic Intellectual Property Management Co., Ltd., Osaka (JP)

(72) Inventors: Daizaburo Matsuki, Osaka (JP); Takashi Yamada, Osaka (JP); Yoshiaki Iwata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 205 days.

(21) Appl. No.: 16/304,211

(22) PCT Filed: Jun. 1, 2017

(86) PCT No.: PCT/JP2017/020455
§ 371 (c)(1),
(2) Date: Nov. 23, 2018

(87) PCT Pub. No.: WO2017/221663
PCT Pub. Date: Dec. 28, 2017

(65) Prior Publication Data
US 2020/0322583 A1    Oct. 8, 2020

(30) Foreign Application Priority Data

Jun. 20, 2016  (JP) .............................. JP2016-122044

(51) Int. Cl.
*H04N 9/31* (2006.01)
*G09G 3/36* (2006.01)
*G09G 5/10* (2006.01)

(52) U.S. Cl.
CPC ......... *H04N 9/3182* (2013.01); *G09G 3/3607* (2013.01); *G09G 5/10* (2013.01);
(Continued)

(58) Field of Classification Search
CPC ....... G09G 2360/141; G09G 2360/145; G09G 2320/0646; G09G 5/10; G09G 3/3607; H04N 9/3182
See application file for complete search history.

(56) References Cited

U.S. PATENT DOCUMENTS

| | | | |
|---|---|---|---|
| 5,086,354 A * | 2/1992 | Bass ................... | H04N 13/346 359/465 |
| 2007/0058859 A1* | 3/2007 | Baker ..................... | H04N 1/60 382/167 |

(Continued)

FOREIGN PATENT DOCUMENTS

| | | |
|---|---|---|
| JP | 2005-138801 | 6/2005 |
| JP | 2010-114768 | 5/2010 |
| WO | 2013/042767 | 3/2013 |

OTHER PUBLICATIONS

International Search Report dated Aug. 22, 2017 in International (PCT) Application No. PCT/JP2017/020455.

*Primary Examiner* — Michael E Teitelbaum
(74) *Attorney, Agent, or Firm* — Wenderoth, Lind & Ponack, L.L.P.

(57) ABSTRACT

A video display system (1) includes a display device (10) displaying a display video image containing a transmitted background and a video image indicated by a video signal, and a video processing device (30) converting, based on a characteristic related to the transmitted background, the video image indicated by the video signal to be transmitted to the display device (10).

9 Claims, 15 Drawing Sheets

(52) U.S. Cl.
CPC ............ *G09G 2320/0646* (2013.01); *G09G 2360/141* (2013.01); *G09G 2360/145* (2013.01)

(56) References Cited

U.S. PATENT DOCUMENTS

| | | | |
|---|---|---|---|
| 2012/0249787 A1* | 10/2012 | Allegro | G06K 9/00758 |
| | | | 348/143 |
| 2014/0226015 A1 | 8/2014 | Takatsudo et al. | |
| 2014/0300634 A1* | 10/2014 | Cho | G06T 19/00 |
| | | | 345/633 |
| 2016/0351164 A1* | 12/2016 | Hsieh | G09G 5/026 |

* cited by examiner

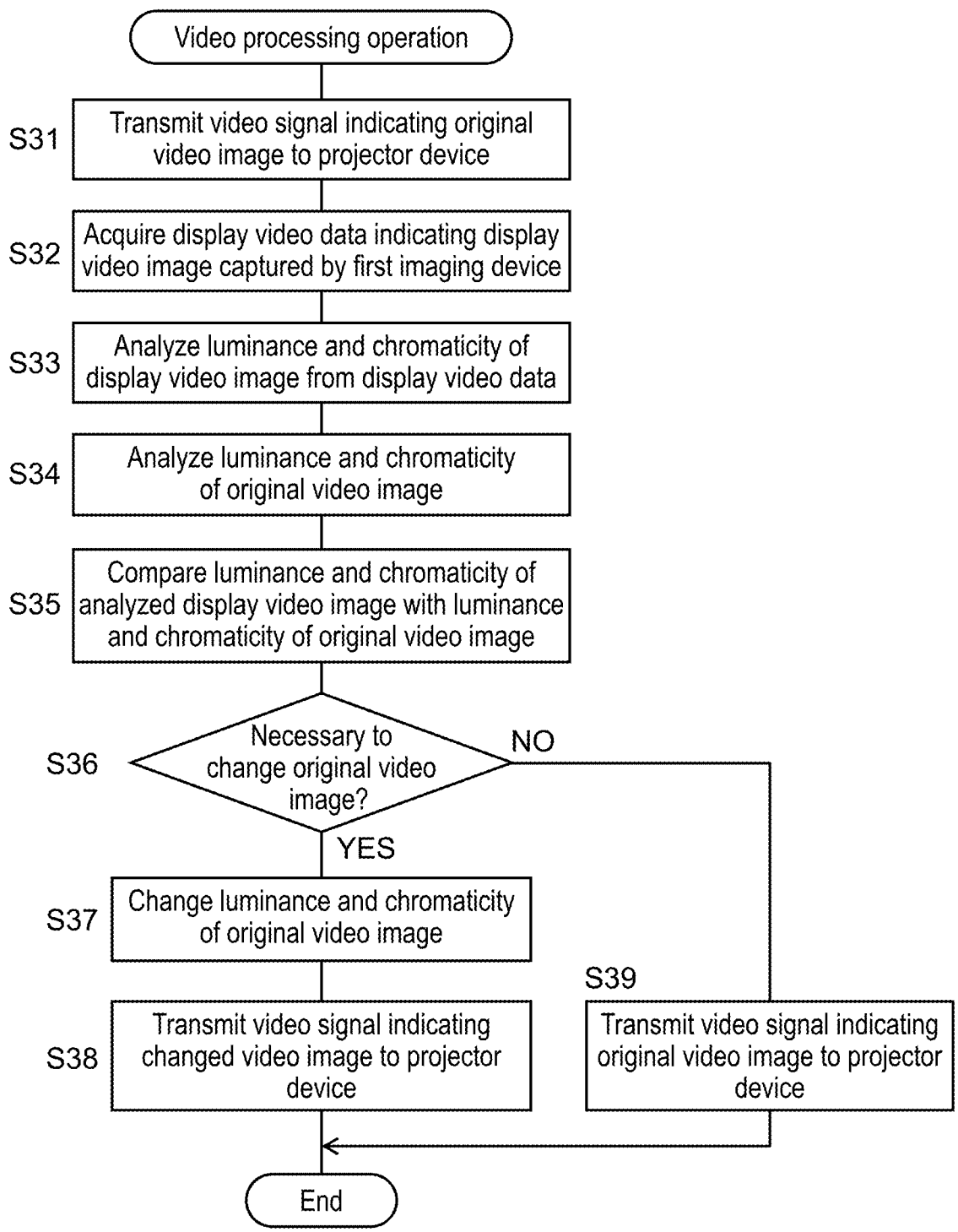

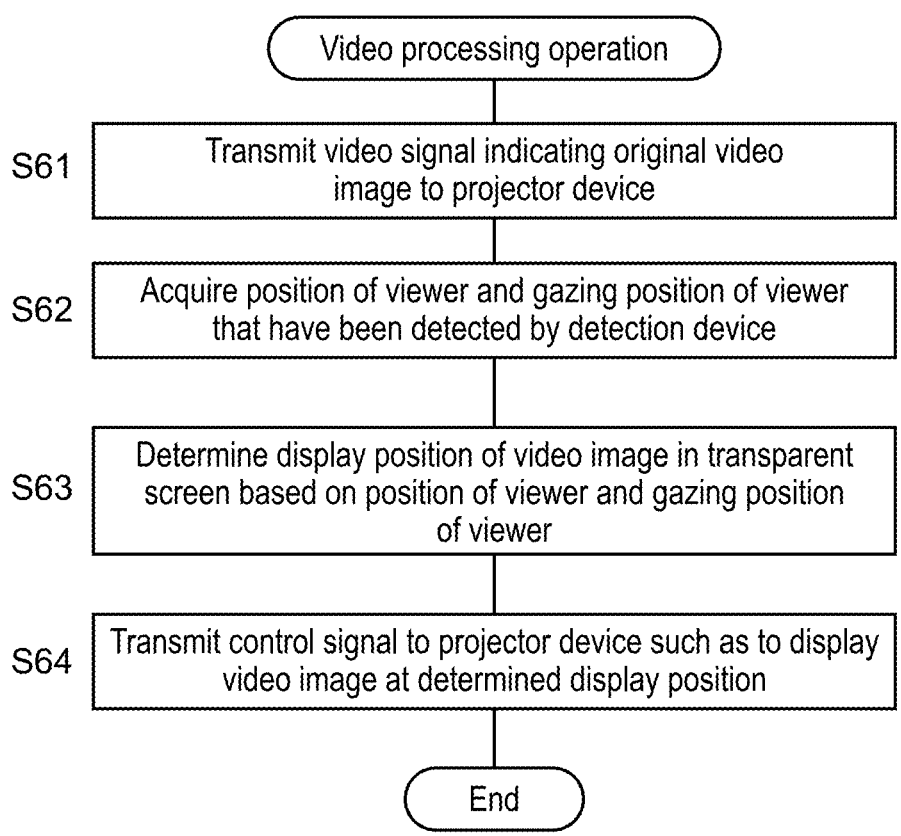

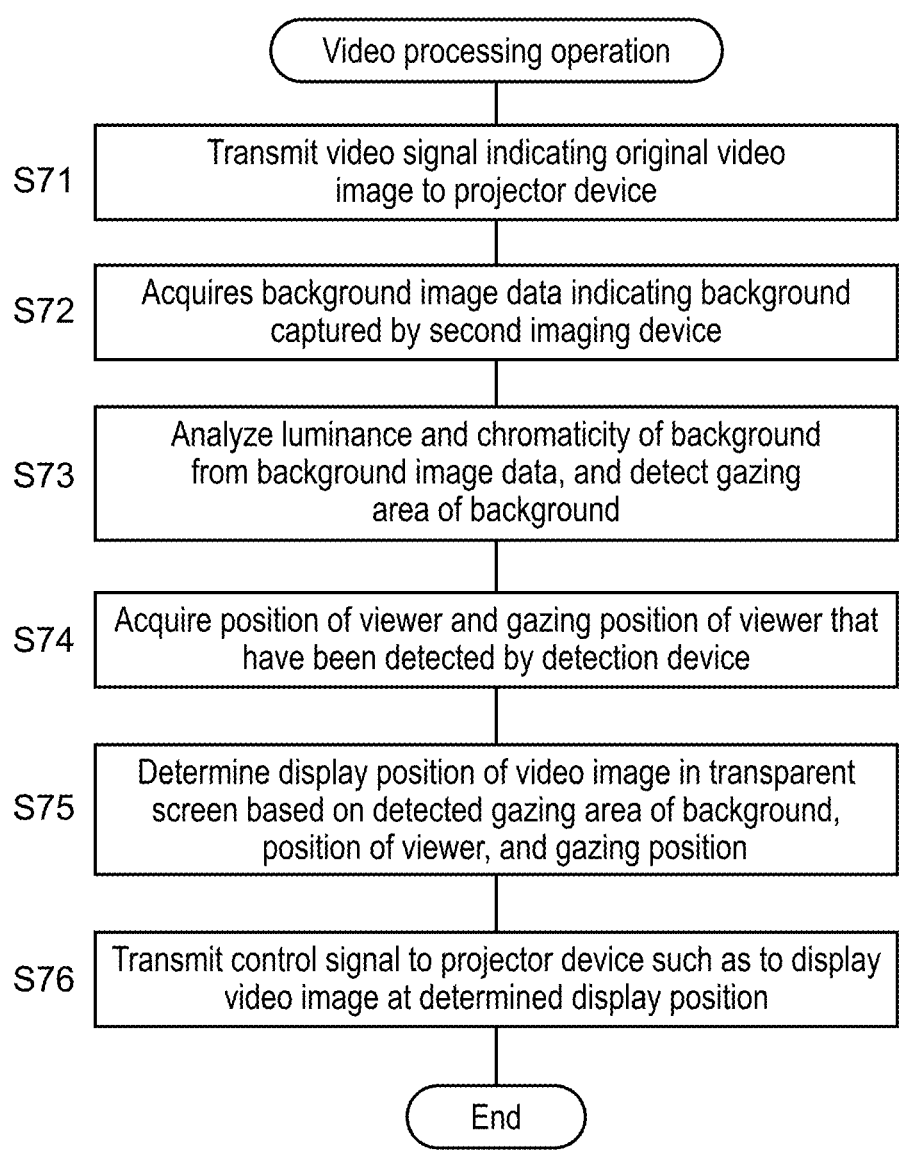

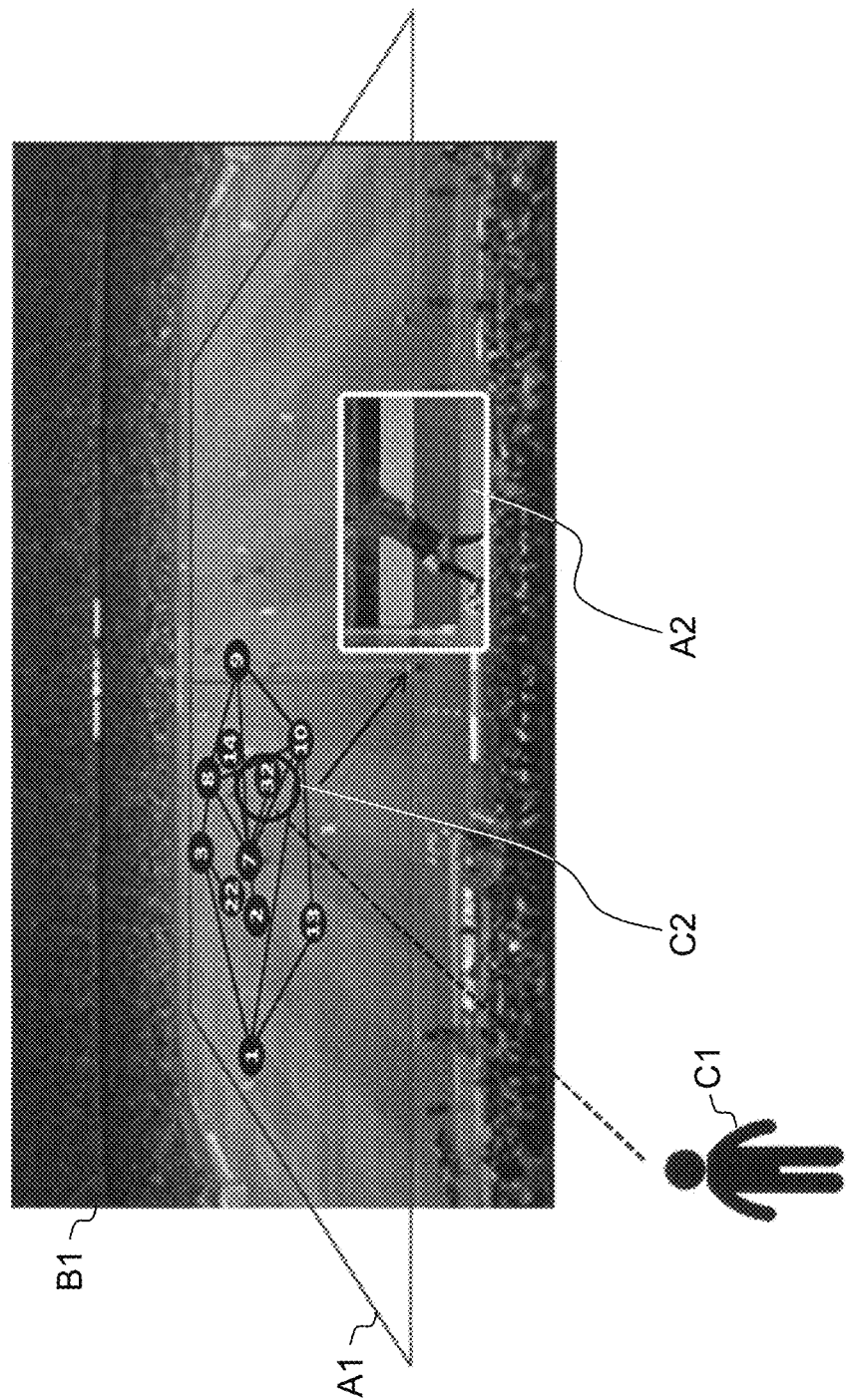

VIDEO DISPLAY SYSTEM

TECHNICAL FIELD

The present disclosure relates to a video display system.

BACKGROUND ART

Patent Literature 1 discloses a video display system. This video display system utilizes a projector as a video display device, not only a cathode ray tube (CRT) or a liquid crystal display, to display video images on a screen.

CITATION LIST

Patent Literature

PTL 1: Japanese Patent Unexamined Publication No. 2010-114768

SUMMARY

In recent years, it has been known that there is a video display system that displays a video image on a transparent display device, such as a transparent screen or a transparent electroluminescent (EL) display device, to enable a viewer to view both the video image and a background through the display device simultaneously.

The present disclosure provides a video display system that prevents degradation of visibility of a video image that occurs due to the background of a transparent display device, when the video image overlaps the background in the display device.

A video display system according to the present disclosure includes a display device displaying a display video image containing a transmitted background and a video image indicated by a video signal, and a video processing device converting, based on a characteristic related to the transmitted background, a video image indicated by the video signal to be transmitted to the display device.

The video display system according to the present disclosure makes it possible to prevent degradation of visibility of a video image that occurs due to the background of a display device, when the video image overlaps the background in the display device.

BRIEF DESCRIPTION OF DRAWINGS

FIG. 6 is a flowchart illustrating a video processing operation performed by a video processing device according to a third exemplary embodiment.

FIG. 12 is a flowchart illustrating a video processing operation performed by a video processing device according to a sixth exemplary embodiment.

FIG. 14 is a flowchart illustrating a video processing operation performed by a video processing device according to a seventh exemplary embodiment.

FIG. 15 is a view for illustrating an example of a determination operation for a display position of a video image that is performed by the video processing device.

DESCRIPTION OF EMBODIMENTS

Hereinbelow, exemplary embodiments will be described in detail with reference to the drawings. However, unnecessarily detailed description may be omitted. For example, detailed description of well-known matters and repetitive description of substantially the same structures may be omitted. This is to prevent the following description from becoming redundant and to facilitate understanding for those skilled in the art.

It should be noted that the inventors provide the appended drawings and the following description in order that those skilled in the art can fully understand the present disclosure, and the appended drawings and the following description are intended to limit the subject matter set forth in the claims.

First Exemplary Embodiment

Hereinbelow, a first exemplary embodiment will be described with reference to FIGS. 1 to 3.

1-1. Configuration

Figure 1:
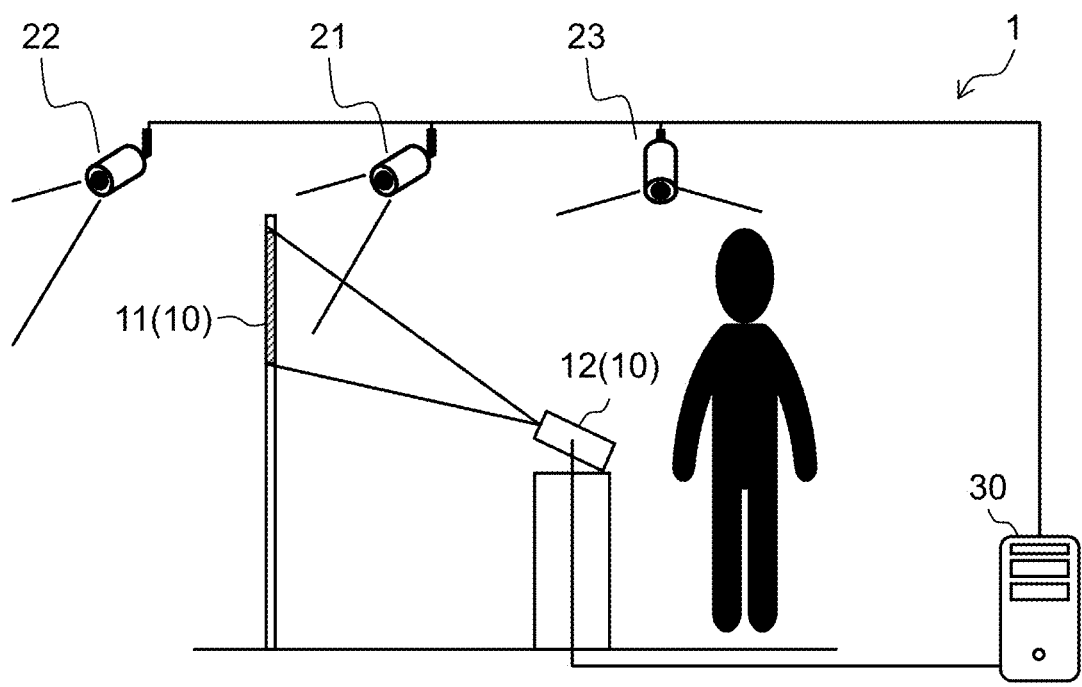
FIG. 1 is a view illustrating the configuration of a video display system according to the present disclosure.

FIG. 1 is a view illustrating the configuration of video display system 1 according to the present disclosure. Video display system 1 illustrated in FIG. 1 includes display device 10, first imaging device 21, second imaging device 22, detection device 23, and video processing device 30. In the present exemplary embodiment, display device 10 includes transparent screen 11 and projector device 12.

Video display system 1 according to the first exemplary embodiment projects video onto transparent screen 11. Video display system 1 is a video display system that allows a viewer to simultaneously view both a video image projected from projector device 12 onto transparent screen 11 and the background of transparent screen 11. For example, transparent screen 11 of this video display system 1 may be applied to a window glass of a viewing room in a soccer stadium, or the like. This enables the viewer to view various information (video image), such as player information, that is displayed on transparent screen 11 while viewing a game (background) through transparent screen 11.

Transparent screen 11 is formed by bonding a sheet having light diffusion function onto a transparent plate, such as glass or resin. Transparent screen 11 transmits a portion of light and simultaneously diffuse-reflects another portion of light. That is, transparent screen 11 transmits the background, and also diffuse-reflects a video image projected by projector device 12 to display the video image.

Projector device 12 projects projection light onto transparent screen 11 based on a video signal from video processing device 30.

Thus, display device 10 displays a display video image containing the transmitted background and the video image indicated by the video signal.

First imaging device 21 is installed, for example, on a ceiling inside the viewing room. First imaging device 21 captures a video image projected on transparent screen 11 and the background observed through transparent screen 11. The captured video image and background are transmitted as display video data to video processing device 30. Examples of first imaging device 21 include a camera and a video camera.

Second imaging device 22 is installed, for example, above and outside the viewing room. Second imaging device 22 directly captures the background of transparent screen 11. The captured background is transmitted as background image data to video processing device 30. Examples of second imaging device 22 include a camera and a video camera. Alternatively, second imaging device 22 may be a sensor that detects illuminance and luminance. When this is the case, second imaging device 22 transmits the detected illuminance and luminance of the background to video processing device 30.

Detection device 23 is installed, for example, on the ceiling inside the viewing room. Detection device 23 detects the position of a viewer and transmits the detected position to video processing device 30. Detection device 23 also detects a gazing position of the viewer and transmits the detected gazing position to video processing device 30. The gazing position of the viewer means a position on transparent screen 11 at which the viewer gazes. Detection device 23 detects the gazing position of the viewer, for example, by detecting the orientation of the head of the viewer with the use of a head tracking device. Alternatively, detection device 23 may detect the gazing position of the viewer by detecting the line of sight of the viewer with the use of a line-of-sight detection device. Examples of detection device 23 for position detection include a position detection sensor and a wearable device. Examples of detection device 23 for gazing position detection include a head tracking device and a line-of-sight detection device.

When the background and the video image overlap in transparent screen 11, video processing device 30 performs conversion of the video image based on any of the following three kinds of information. The first kind of information is information on the display video image (video image+ background) of transparent screen 11, which is indicated by the display video data acquired from first imaging device 21. The second kind of information is information on the background of transparent screen 11, which is indicated by the background image data acquired from second imaging device 22. The third kind of information is information on a characteristic of transparent screen 11 that is known previously, which will be described later. Converting a video image based on these kinds of information improves visibility of the video image on transparent screen 11.

Video processing device 30 also determines the display position of the video image on transparent screen 11 based on any of the following two kinds of information. The first kind of information is information on the background of transparent screen 11 that is indicated by the background image data acquired from second imaging device 22. The second kind of information is information on the position and the gazing position of the viewer, which is acquired from detection device 23. Based these kinds of information, video processing device 30 determines the display position of the video image on transparent screen 11 so that the video image does not overlap a gazing area in the background. This improves visibility of the gazing position at which the viewer gazes, or the gazing area in the background, which contains a target object at which the viewer is expected to gaze. It should be noted that the "gazing area in the background" will be described later while showing an example thereof.

Figure 2:
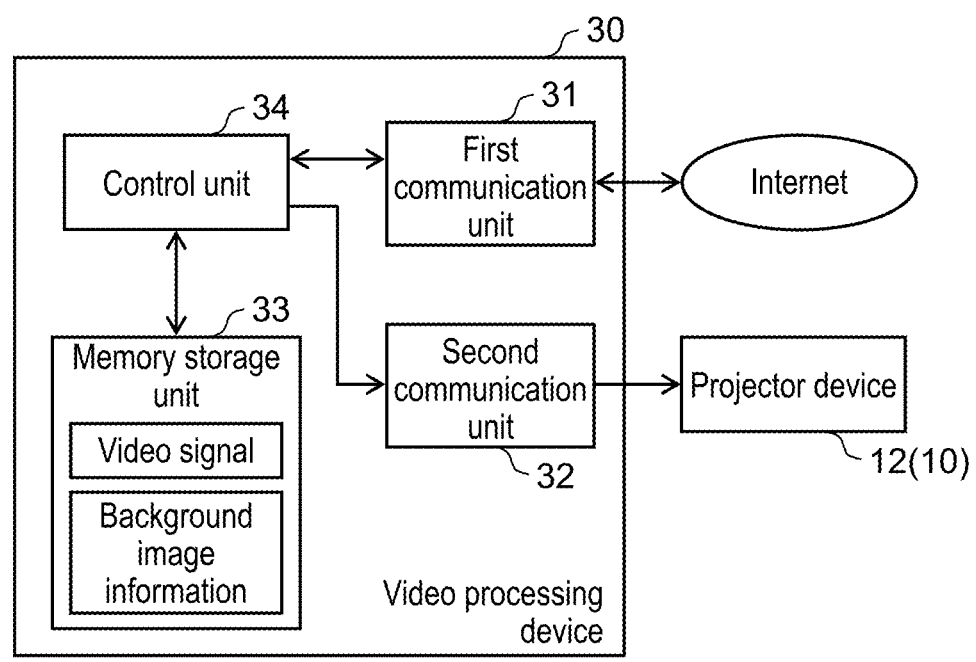
FIG. 2 is a view illustrating the configuration of a video processing device according to the present disclosure.

FIG. 2 is a view illustrating the configuration of video processing device 30 according to the present disclosure. As illustrated in FIG. 2, video processing device 30 includes first communication unit 31, second communication unit 32, memory storage unit 33, and control unit 34.

First communication unit 31 is a communication module that performs data communication with various devices including first imaging device 21, second imaging device 22, and detection device 23 through a network, in compliance with an industrial standard such as IEEE 802.11, Bluetooth (registered trademark), and Wi-Fi. Second communication unit 32 is a communication module that performs data communication with projector device 12 in compliance with an industrial standard such as IEEE 802.11, Bluetooth (registered trademark), and Wi-Fi. In the present exemplary embodiment, because display device 10 includes transparent screen 11 and projector device 12, second communication unit 32 performs data communication with projector device 12, which is the destination of transmission of the video signal.

Memory storage unit 33 is a memory storage device, such as hard disk drive (HDD) and solid state drive (SSD). Memory storage unit 33 stores various programs, and video signals to be transmitted to projector device 12 that are video signals indicating video images to be projected on transparent screen 11 (for example, video signals indicating scores of the game, information on players, and photographic portraits of players). The video signals may be provided from an external device via first communication unit 31 and a network. Memory storage unit 33 also stores characteristics of transparent screen 11 (display characteristics when transmitting the background of the display device, in other words, characteristics related to the background). For example, the characteristics of transparent screen 11 include background image information indicating the background that has been captured in advance by first imaging device 21 through transparent screen 11.

Control unit 34 may be composed of central processing unit (CPU) or micro-processing unit (MPU). Control unit 34 controls the overall operation of video processing device 30. Control unit 34 executes the programs stored in memory storage unit 33 to implement various functions. The various functions of control unit 34 will be described in more detail in the description of operations, which will be given later.

Although the functions of control unit 34 are implemented by combinations of hardware and software, it is also possible that control unit 34 may be implemented by a hardware circuit that is dedicatedly designed so as to achieve a predetermined function. For example, control unit 34 may also be composed of digital signal processor (DSP), field programmable gate array (FPGA), application specific integrated circuit (ASIC), or the like, as well as CPU and MPU.

Hereinabove, the configurations of video display system 1 and video processing device 30 according to the present disclosure have been described. Video display system 1 according to the first exemplary embodiment converts an original video image based on the background image information indicating the background that has been captured in advance by first imaging device 21 through transparent screen 11 (i.e., characteristic of transparent screen 11). Note that the original video image herein means a video image that has not yet been converted by video processing device 30.

1-2. Operations

The operations of video display system 1 of the first exemplary embodiment that is configured in the above-described manner will be described below.

Video display system 1 of the present exemplary embodiment performs conversion of an original video image based on a characteristic of transparent screen 11 when a video image overlaps the background in transparent screen 11 so as to improve visibility of the video image. The characteristic of transparent screen 11 referred to herein is background image information indicating the background that has been captured in advance by first imaging device 21 through transparent screen 11. The video image referred to herein is a video image that is projected onto transparent screen 11 from projector device 12, and the original video image herein means a video image that has not yet been converted. Thus, it is possible to prevent degradation of visibility of a video image that occurs due to the background of transparent screen 11 when the video image overlaps the background in transparent screen 11.

Figure 3:
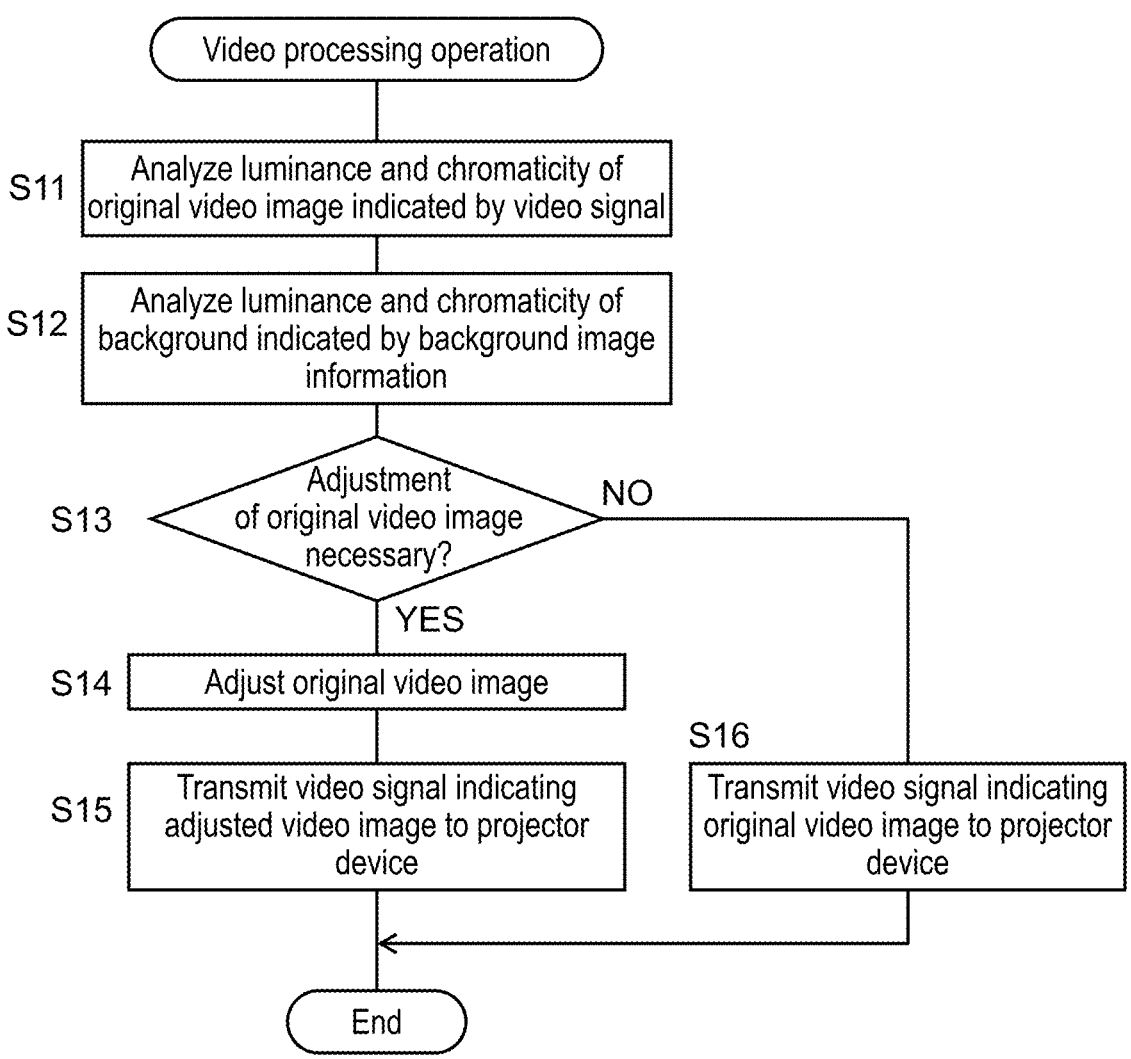
FIG. 3 is a flowchart illustrating a video processing operation performed by a video processing device according to a first exemplary embodiment.

FIG. 3 is a flowchart illustrating a video processing operation performed by video processing device 30 according to the first exemplary embodiment. As illustrated in FIG. 3, control unit 34 of video processing device 30 analyzes the luminance and chromaticity of the original video image indicated by a video signal stored in memory storage unit 33 (S11). Control unit 34 also analyzes the luminance and chromaticity of the background captured by first imaging device 21 and indicated by the background image information stored in memory storage unit 33 (S12).

Next, based on the results of these analyses, control unit 34 determines whether or not adjustment of the original video image is necessary (S13). Specifically, control unit 34 determines that adjustment of the original video image is necessary if the visibility of the video image degrades due to the background when the video image overlaps the background in transparent screen 11 (YES at S13). For example, control unit 34 determines that adjustment of the original video image is necessary if the luminance of the original video image is lower than a predetermined threshold value that is determined taking into account the luminance of the background, or if the difference between the color of the original video image and the color of the background is small. Control unit 34 also determines that adjustment of the original video image is necessary if the contrast of the original video image is less than a predetermined amount, or if the contrast of the original video image and the background is less than a predetermined amount.

Control unit 34 performs adjustment of the original video image if it determines that adjustment of the original video image is necessary (S14). For example, control unit 34 performs adjustments of luminance, chromaticity, and contrast of the original video, and adjustment such as outline enhancement. More specifically, when the luminance of the background is high, control unit 34 performs adjustment such as to increase the luminance of the original video image. Also, control unit 34 changes the color of the original video image into a bright color, such as white, yellow, and light blue when the color of the black color is a dark color, such as black, blue, and red. Performing the adjustment as described above improves the visibility of the video image even when the video image overlaps the background on transparent screen 11.

Thereafter, control unit 34 transmits the video signal indicating the adjusted video image to projector device 12 (S15).

On the other hand, if control unit 34 determines that adjustment of the original video image is not necessary at step S13 (NO at S13), control unit 34 transmits the video signal indicating the original video image to projector device 12 (S16).

This allows projector device 12 to generate projection light based on the video signal and to project the projection light onto transparent screen 11.

1-3. Advantageous Effects, Etc

As described above, in the present exemplary embodiment, video display system 1 includes transparent screen 11, projector device 12, and video processing device 30. Transparent screen 11 and projector device 12 display a display video image, which contains a video image indicated by a video signal and a transmitted background. Video processing device 30 converts a video image indicated by the video signal to be transmitted to projector device 12 based on the characteristic of transparent screen 11 (characteristic related to the background transmitted through transparent screen 11).

As a result, it is possible to perform conversion of a video image based on a characteristic of transparent screen 11 when the video image overlaps the background in transparent screen 11 so as to improve visibility of the video image. The characteristic of transparent screen 11 referred to herein means, for example, the background image information indicating the background that has been captured in advance by first imaging device 21 through transparent screen 11. Thus, it is possible to prevent degradation of visibility of a video image that occurs due to the background of transparent screen 11 when the video image overlaps the background in transparent screen 11.

Second Exemplary Embodiment

In the first exemplary embodiment, video processing device 30 adjusts the whole original video image indicated by the video signal. In the second exemplary embodiment, when the original video image indicated by the video signal contains characters or a still image of such an object as a human or an animal, video processing device 30 extracts the characters or the still image of such an object as a human or an animal, and processes the extracted characters or the extracted still image.

The configuration of video display system 1 according to the second exemplary embodiment is fundamentally the same as that of the first exemplary embodiment, which has been described with reference to FIGS. 1 and 2, but the functions and operations of control unit 34 of video processing device 30 are different from those described previously. Video display system 1 according to the second exemplary embodiment converts characters and still images in an original video image based on the background image information indicating the background that has been captured in advance by first imaging device 21 through transparent screen 11 (i.e., based on the characteristic of transparent screen 11).

Figure 4:
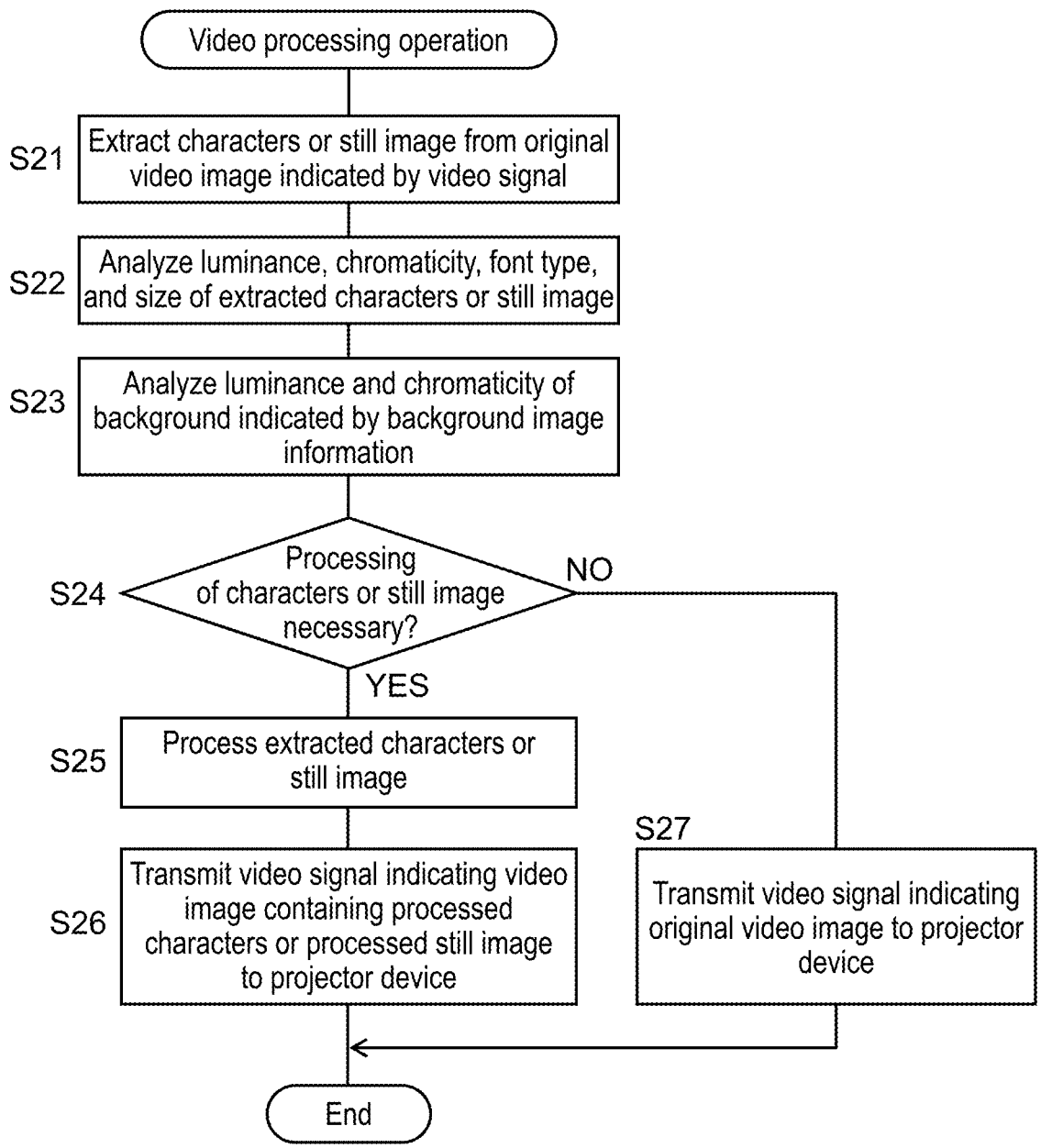
FIG. 4 is a flowchart illustrating a video processing operation performed by a video processing device according to a second exemplary embodiment.

Hereinbelow, the operation of video processing device 30 according to the second exemplary embodiment will be described with reference to FIGS. 4, 5A, and 5B. FIG. 4 is a flowchart illustrating a video processing operation performed by video processing device 30 according to the second exemplary embodiment.

As illustrated in FIG. 4, control unit 34 of video processing device 30 extracts characters, or a still image of such an object as a human or an animal, from the original video image indicated by a video signal stored in memory storage unit 33 (S21). When control unit 34 extracts characters, control unit 34 analyzes the luminance, chromaticity, font type, size, etc., of the characters (S22). When control unit 34 extracts a still image of a human, an animal, or the like, control unit 34 analyzes the luminance, chromaticity, etc., of the still image (S22). Control unit 34 also analyzes the luminance and chromaticity of the background indicated by the background image information stored in memory storage unit 33 (S23).

Next, based on the results of these analyses, control unit 34 determines whether or not processing of the characters or the still image is necessary (S24). Specifically, control unit 34 determines that processing of the characters or the still image is necessary if the visibility of the characters or the still image degrades due to the background when the background overlaps the characters or the still image in transparent screen 11 (YES at S24). Control unit 34 performs processing of the characters or the still image if it determines that processing of the characters or the still image is necessary (S25). Performing the adjustment as described above improves the visibility of the characters or the still image even when the characters or the still image overlaps the background on transparent screen 11. The following describes an example of the determination as to the necessity of processing of characters or a still image, and an example of the processing of the characters or the still image.

Figure 5A:
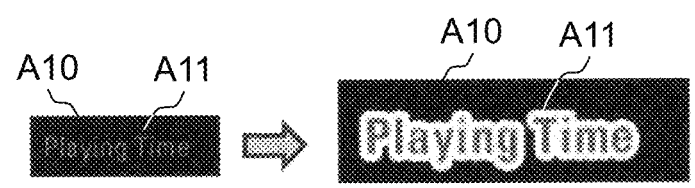
FIG. 5A is a view for illustrating an example of processing of characters that are contained in an original video image.
Figure 5B:
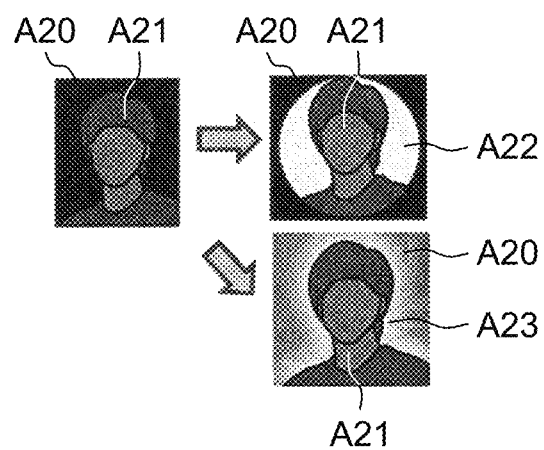
FIG. 5B is a view for illustrating an example of processing of a still image of a human that is contained in an original video image.

FIG. 5A is a view for illustrating an example of processing of characters contained in an original video image, and FIG. 5B is a view for illustrating an example of processing of a still image of a human contained in an original video image. In the example shown in FIG. 5A, original video image A10 in a rectangular shape contains characters A11, and the portion of original video image A10 other than characters A11 is colorless. In the example shown in FIG. 5B, original video image A20 in a rectangular shape contains still image A21 of a human, and the portion of original video image A20 other than still image A21 is colorless. Original video images A10 and A20 herein are video images that have not yet been processed.

Here, the inventors of the present application have found that, when the background of transparent screen 11 is in a dark color such as black (so-called a black background), the characters displayed on such transparent screen 11 are difficult to view, if the characters to be displayed on transparent screen 11 are in a dark color such as blue or red and also the size of the characters is less than a certain size. The inventors of the present application have also found that, when the background of transparent screen 11 is in a dark color, such as black, the still image of a human, an animal, or the like displayed on such transparent screen 11 is difficult to view. On the basis of such knowledge, when characters and a still image are difficult to view, the present exemplary embodiment allows processing of the characters and the still image so that they can be viewed easily.

Specifically, control unit 34 extracts characters A11 from original video image A10, for example, as illustrated in FIG. 5A. Then, control unit 34 determines that processing of characters A11 is necessary if the background of transparent screen 11 indicated by the background image information is in a dark color, such as black, characters A11 are in a dark color, such as blue or red, and moreover, the size of characters A11 is equal to or less than a predetermined size (YES at S24). On the other hand, control unit 34 determines that processing of characters A11 is not necessary if the size of characters A11 is greater than the predetermined size although the background of transparent screen 11 is in a dark color, such as black, and characters A11 are in a dark color, such as blue or red (NO at S24). Also, control unit 34 determines that processing of characters A11 is not necessary if the background of transparent screen 11 is in a dark color, such as black, and characters A11 are in a bright color, such as white or yellow (NO at S24).

Control unit 34 performs processing to enhance the silhouette of characters A11 if it is determined that processing of characters A11 is necessary (S25). For example, control unit 34 may change the color of characters A11 into a bright color, such as light blue, may outline characters A11 with a bright color, such as white, may make the size of characters A11 larger than the predetermined size, or may change font type (for example, may change Ming typeface into Gothic typeface).

Alternatively, control unit 34 extracts still image A21 of a human from original video image A20, for example, as illustrated in FIG. 5B. Then, control unit 34 determines that processing of still image A21 is necessary if the background of transparent screen 11 indicated by the background image information is in a dark color, such as black (YES at S24).

Control unit 34 performs processing to enhance the silhouette of still image A21 if it determines that processing of still image A21 is necessary (S25). For example, control unit 34 may add circular region A22 in a bright color, such as white, around still image A21 of a human (circle outlining, which is a so-called outlining process), or may set a bright color for the portion of original video image A20 other than still image A21 (background filling, which is a so-called outlining process). Alternatively, control unit 34 may perform a gloss effect process (which is a so-called outlining process) of providing glossy looking region A23 around still image A21.

Thereafter, control unit 34 transmits the video signal indicating the video image containing the processed characters or the processed still image to projector device 12 (S26).

On the other hand, if control unit 34 determines that processing is not necessary for the characters or the still image at step S24 (NO at S24), control unit 34 transmits the video signal indicating the original video image to projector device 12 (S27).

This allows projector device 12 to generate projection light based on the video signal and to project the projection light onto transparent screen 11.

Thus, with video display system 1 according to the second exemplary embodiment, when the original video image indicated by the video signal contains characters or a still image of such an object as a human or an animal, video processing device 30 extracts the characters or the still image of such an object as a human or an animal from the video image. Next, video display system 1 performs processing of enhancing the silhouette of the characters or the still image based on the characteristic of transparent screen 11 so as to improve visibility of the characters or the still image when the characters or the still image overlap(s) the background in transparent screen 11. Thus, it is possible to prevent degradation of visibility of a video image that occurs due to the background of transparent screen 11 when the video image overlaps the background in transparent screen 11. Note that the characteristic of transparent screen 11 referred to herein is background image information indicating the background that has been captured in advance by first imaging device 21 through transparent screen 11.

Third Exemplary Embodiment

In the first and second exemplary embodiments, an original video image is converted based on the background image information indicating the background that has been captured in advance by first imaging device 21 through transparent screen 11 (i.e., the characteristic of transparent screen 11). In the third exemplary embodiment, an original video image is converted based on a display video image (video image+background) displayed on transparent screen 11.

The configuration of video display system 1 according to the third exemplary embodiment is fundamentally the same as that of the first exemplary embodiment, which has been described with reference to FIGS. 1 and 2, but the functions and operations of control unit 34 of video processing device 30 are different from those described previously. Note that video display system 1 according to the third exemplary embodiment converts the original video image based on an output of first imaging device 21.

Hereinbelow, the operation of video processing device 30 according to the third exemplary embodiment will be described with reference to FIGS. 6, 7A, and 7B. FIG. 6 is a flowchart illustrating a video processing operation performed by video processing device 30 according to the third exemplary embodiment.

As illustrated in FIG. 6, control unit 34 of video processing device 30 transmits, to projector device 12, the video signal indicating the original video image, which is stored in memory storage unit 33 (S31). This allows projector device 12 to generate projection light based on the video signal and to project the projection light onto transparent screen 11. First imaging device 21 captures a display video image in which the original video image displayed on transparent screen 11 overlaps the background viewed through transparent screen 11.

Next, control unit 34 acquires display video data indicating the display video image captured by first imaging device 21 (S32). Next, control unit 34 analyzes the luminance and chromaticity of the display video image from the acquired display video data (S33). Also, control unit 34 analyzes the luminance and chromaticity of the original video image indicated by the video signal stored in memory storage unit 33 (S34).

Next, control unit 34 compares the luminance and chromaticity of the analyzed display video image with the luminance and chromaticity of original video image (S35), and determines, based on the result of comparison of the analyses, whether or not it is necessary to change the luminance and chromaticity of the original video image (S36). Specifically, control unit 34 determines that it is necessary to change the luminance and chromaticity of the original video image if visibility of the display video image degrades (YES at S36). Control unit 34 performs a process of changing the luminance and chromaticity of the original video image so that the display video image can be viewed more easily if control unit 34 determines that it is necessary to change the luminance and chromaticity of the original video image (S37). The following describes an example of the determination as to the necessity to change the luminance and chromaticity of the original video image, and an example of the process of changing the luminance and chromaticity of the original video image.

Figure 7A:
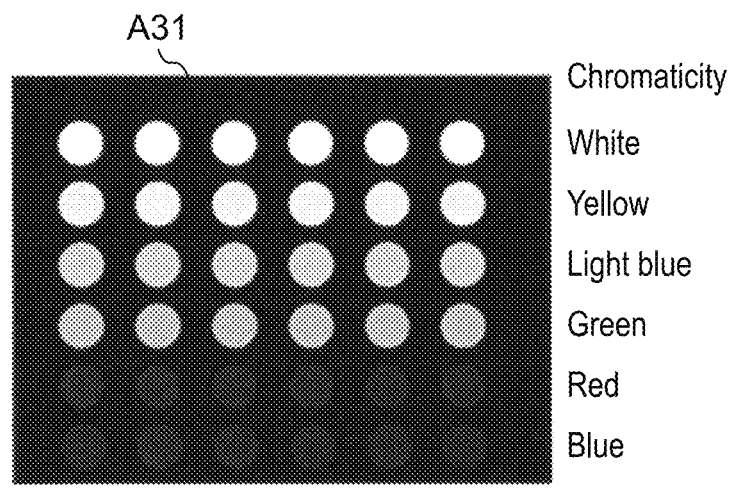
FIG. 7A is a view illustrating an example of original video image to be displayed on a transparent screen.
Figure 7B:
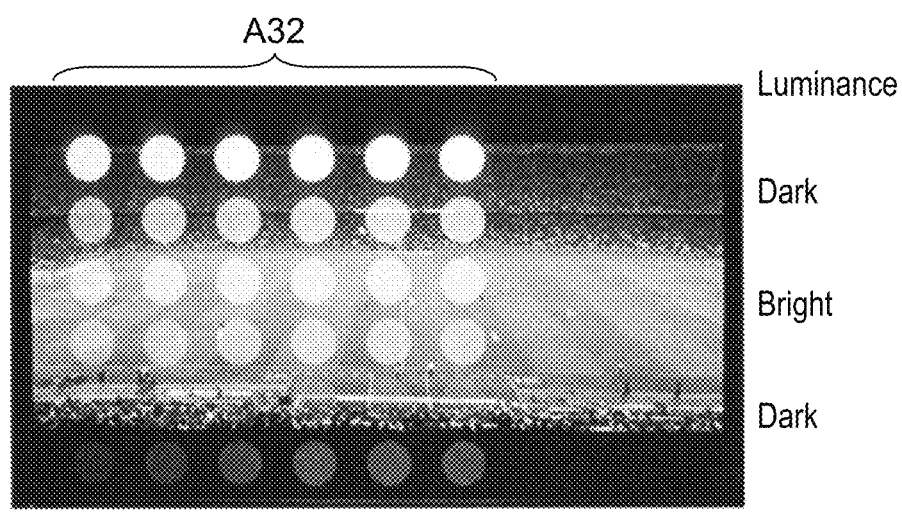
FIG. 7B is a view illustrating an example of a display video image in which the original video image displayed on the transparent screen overlaps a background.

FIG. 7A is a view illustrating an example of original video image A31 to be displayed on transparent screen 11, and FIG. 7B is a view illustrating an example of video image A32 in which original video image A31 displayed on transparent screen 11 overlaps the background. In the example of FIG. 7A, original video image A31 contains a plurality of circular shaped images in different colors. More specifically, original video image A31 contains a white color image array, a yellow color image array, a light blue color image array, a green color image array, a red color image array, and a blue color image array, each color image array including six circular shaped images.

In the example of FIG. 7B, transparent screen 11 transmits the background containing the playing field and the spectator seat area of a soccer stadium, and displays the video image based on original video image A31 shown in FIG. 7A. This enables the viewer to observe video image A32, in which original video image A31 overlaps the background. When video image A32 is displayed on transparent screen 11, it may occur that the brightness and color tone of original video image A31 is not reproduced or video image A32 is difficult to view due to the luminance and chromaticity of the background of transparent screen 11. In the example of FIG. 7B, the luminance of the playing field of the soccer stadium is high in the background of transparent screen 11, and the luminance of the spectator seat area is low. As will be described later in the description of FIG. 9, the playing field of the soccer stadium contains green mainly, and the spectator seat area contains such colors as blue, red, and white. Thus, different areas in the background of transparent screen 11 may have different luminances and chromaticities.

Control unit 34 determines that it is necessary to change the luminance and chromaticity of original video image A31 if the brightness and color tone of original video image A31 are not reproduced in video image A32, or if video image A32 is difficult to view because the brightness and color tone of original video image A31 are similar to the brightness and color tone of the background (YES at S36). Control unit 34 changes the luminance and chromaticity of original video image A31 if it determines that it is necessary to change the luminance and chromaticity of original video image A31 (S37). For example, control unit 34 changes the luminance and chromaticity of original video image A31 so that the brightness and color tone of original video image A31 can be reproduced in video image A32 more faithfully, or that video image A32 can be viewed more easily. At this time, control unit 34 may further perform the conversion of the original video image according to the above-described first exemplary embodiment and/or the extraction and processing of the characters or the still image of such an object as a human or an animal according to the above-described second exemplary embodiment.

Thereafter, control unit 34 transmits, to projector device 12, the video signal indicating the video image that has been subjected to the changing process (S38).

If control unit 34 determines that no change is necessary at step S36 (NO at S36), control unit 34 transmits the video signal indicating original video image A31 to projector device 12 (S39).

This allows projector device 12 to generate projection light based on the video signal indicating original video image A31 and to project the projection light onto transparent screen 11.

As described hereinabove, video display system 1 according to the third exemplary embodiment allows first imaging device 21 to capture a display video image (video image A32) in which original video image A31 displayed on transparent screen 11 overlaps the background viewed through transparent screen 11. Next, video display system 1 performs the process of changing the luminance and chromaticity of original video image A31 so that the display video image can be viewed more easily based on the luminance and chromaticity of the display video image. Thus, it is possible to prevent degradation of visibility of a video image that occurs due to the luminance and chromaticity of the background of transparent screen 11 when the video image overlaps the background in transparent screen 11.

Fourth Exemplary Embodiment

In the third exemplary embodiment, original video image A31 is converted based on a video image (original video image+background) in which original video image A31 is actually visible on transparent screen 11. In the fourth exemplary embodiment, the original video image is converted based on the background that exists behind transparent screen 11.

The configuration of video display system 1 according to the fourth exemplary embodiment is fundamentally the same as that of the first exemplary embodiment, which has been described with reference to FIGS. 1 and 2, but the functions and operations of control unit 34 of video processing device 30 are different from those described previously. Note that video display system 1 according to the fourth exemplary embodiment converts the original video image based on an output of second imaging device 22.

Figure 8:
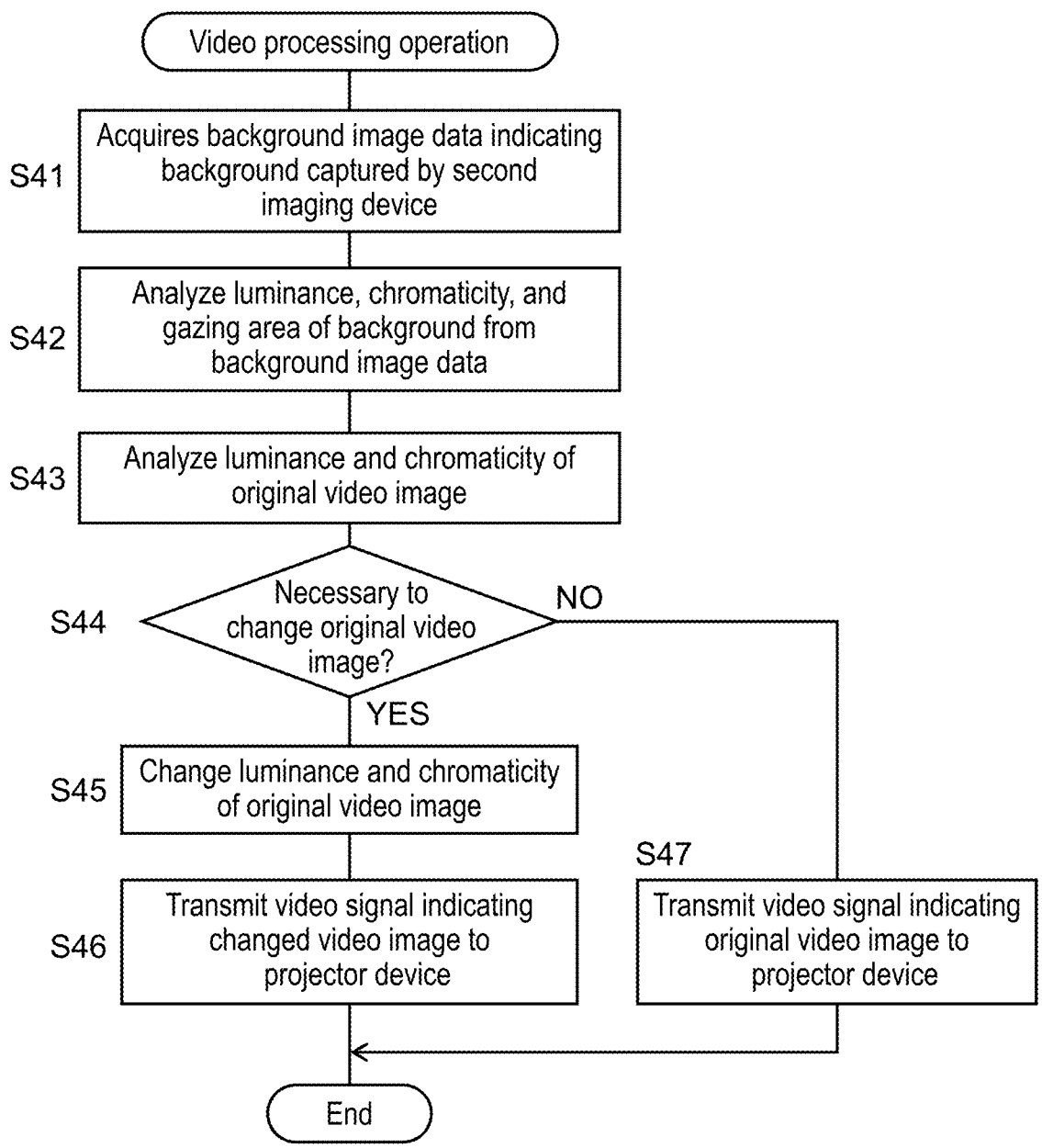
FIG. 8 is a flowchart illustrating a video processing operation performed by a video processing device according to a fourth exemplary embodiment.

Hereinbelow, the operation of video processing device 30 according to the fourth exemplary embodiment will be described with reference to FIGS. 8 and 9. FIG. 8 is a flowchart illustrating a video processing operation performed by video processing device 30 according to the fourth exemplary embodiment.

First, second imaging device 22 directly captures the background of transparent screen 11. Next, as illustrated in FIG. 8, control unit 34 of video processing device 30 acquires the background image data indicating the background captured by second imaging device 22 (S41). Next, control unit 34 analyzes the luminance and chromaticity of the background, and the later-described gazing area in the background, from the acquired background image data (S42). Also, control unit 34 analyzes the luminance and chromaticity of the original video image indicated by a video signal stored in memory storage unit 33 (S43).

Next, based on the results of these analyses, control unit 34 determines whether or not it is necessary to change the luminance and chromaticity of the original video image is necessary (S44). Specifically, control unit 34 determines that it is necessary to change the luminance and chromaticity of the original video image if visibility of the display video image degrades (YES at S44). Control unit 34 performs a process of changing the luminance and chromaticity of the original video image if control unit 34 determines that it is necessary to change the luminance and chromaticity of the original video image (S45). Performing the above-described changing process enables the viewer to view the display video image on transparent screen 11 more easily. The following describes an example of the determination as to the necessity to change the luminance and chromaticity of the original video image, and an example of the process of changing the luminance and chromaticity of the original video image.

Figure 9:
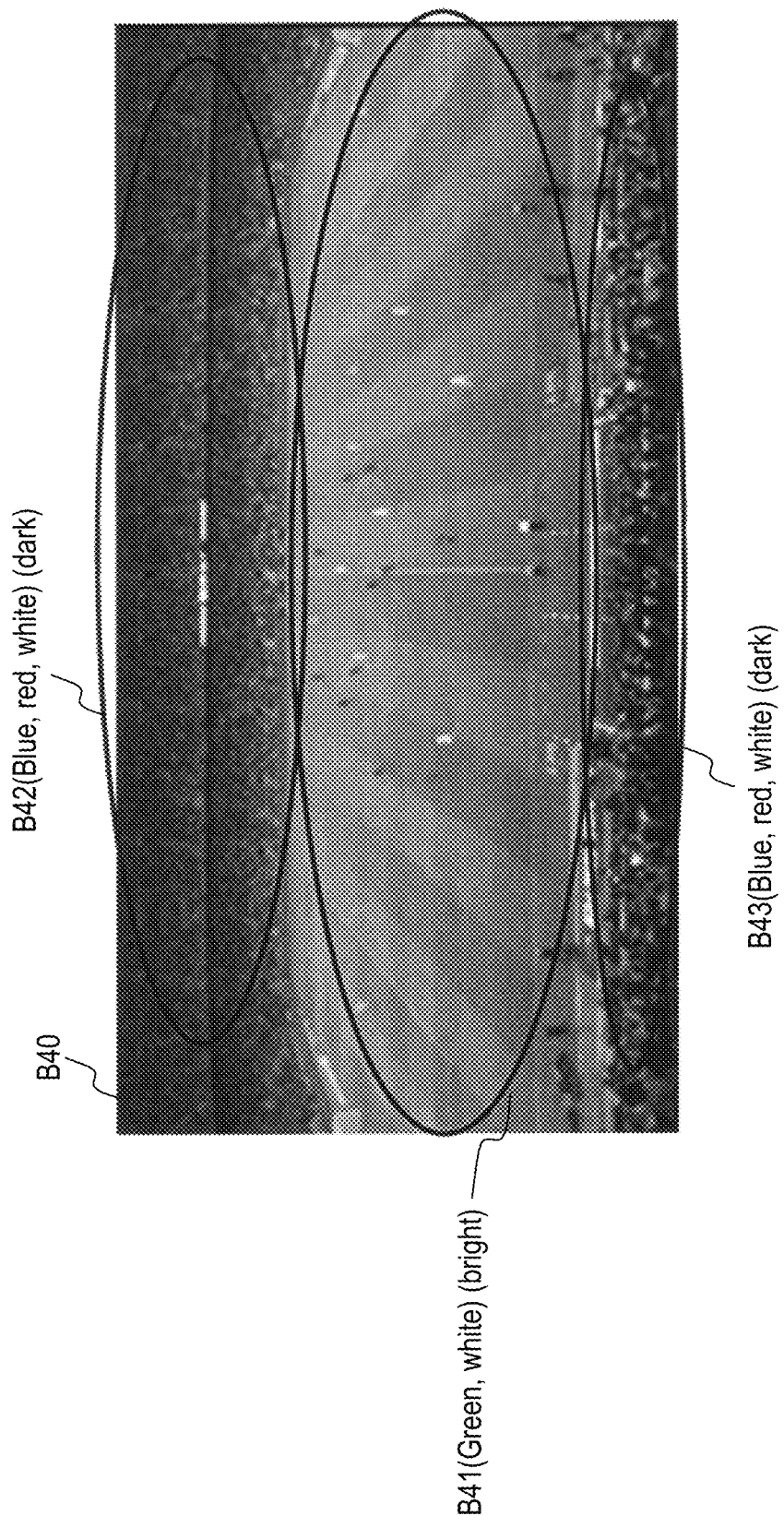
FIG. 9 is a view illustrating an example of a background captured by a second imaging device.

FIG. 9 is a view illustrating an example of background B40 captured by second imaging device 22. The example of FIG. 9 shows background B40, which contains the playing field and the spectator seat area of a soccer stadium, and background B40 includes three regions B41, B42, and B43 with different luminances and chromaticities. In the present exemplary embodiment, vertically central region B41 corresponds to the playing field of the soccer stadium, and mainly contains green colors originating from grass. Central region B41 also contains a white color originating from the uniforms of the players. The luminance of this region B41 is high. Vertically upper region B42 and vertically lower region B43 correspond to spectator seat areas and contain blue, red, and white colors. The luminance of these regions B42 and B43 is low. When background B40 captured by second imaging device 22 contains a plurality of regions that are different in luminance and chromaticity, control unit 34 analyzes the gazing area in the background. The gazing area in the background is an area of the target object into which the viewer is expected to gaze, or a predetermined area that contains the target object and is wider than the target object, within a background image captured by second imaging device 22. For example, when the target object is a playing field of a soccer stadium, the gazing area in the background is the area of the playing field. Alternatively, when the target object is a soccer ball, the gazing area in the background is a predetermined area that contains the soccer ball. For example, in the example shown in FIG. 9, the gazing area is set to area B41, which is the area of the playing field (target object) of the soccer stadium (S42).

Next, control unit 34 analyzes the luminance and chromaticity of the original video image indicated by a video signal stored in memory storage unit 33 (S43). Then, control unit 34 determines that it is necessary to change the luminance and chromaticity of the original video image if, for example, the original video image overlaps gazing area B41 in the background and it is expected that the brightness and color tone of the original video image are not reproduced (YES at S44). In addition, control unit 34 also determines that it is necessary to change the luminance and chromaticity of the original video image if the original video image overlaps gazing area B41 in the background and it is expected that the original video image is difficult to view because the brightness and color tone of the original video image is similar to the brightness and color tone of the background. If control unit 34 determines that it is necessary to change the luminance and chromaticity of the original video image, as described above, control unit 34 changes the luminance and chromaticity of the original video image to match the luminance and chromaticity of gazing area B41 in the background (S45). This changing allows the viewer to observe the original video image more easily, and also serves to reproduce the brightness and color tone of the original video image more faithfully. At this time, control unit 34 may further perform the conversion of the original video image according to the above-described first exemplary embodiment and/or the extraction and processing of the characters or the still image of such an object as a human or an animal according to the above-described second exemplary embodiment.

Thereafter, control unit 34 transmits, to projector device 12, the video signal indicating the video image that has been subjected to the changing process (S46).

If control unit 34 determines that no change is necessary at step S44 (NO at S44), control unit 34 transmits the video signal indicating the original video image to projector device 12 (S47).

This allows projector device 12 to generate projection light based on the video signal and to project the projection light onto transparent screen 11.

Thus, with video display system 1 according to the fourth exemplary embodiment, the background of transparent screen 11 is directly captured by second imaging device 22. Next, video processing device 30 analyzes the luminance and chromaticity of the background captured by second imaging device 22. Based on the result of this analysis, video display system 30 performs the process of changing the luminance and chromaticity of the original video image so that the display video image can be viewed more easily. Thus, it is possible to prevent degradation of visibility of the display video image that occurs due to, for example, the luminance and chromaticity of the background of transparent screen 11 when the video image overlaps the background in transparent screen 11.

Fifth Exemplary Embodiment

The first to fourth exemplary embodiments have described embodiments in which conversion of an original video image is performed for the purpose of improving visibility of a video image displayed on transparent screen 11. The fifth exemplary embodiment describes an embodiment in which the display position of the original video image is changed for the purpose of improving visibility of the background viewed through transparent screen 11.

The configuration of video display system 1 according to the fifth exemplary embodiment is fundamentally the same as that of the first exemplary embodiment, which has been described with reference to FIGS. 1 and 2, but the functions and operations of control unit 34 of video processing device 30 are different from those described previously. Note that video display system 1 according to the fifth exemplary embodiment determines the display position of the video image based on an output of second imaging device 22.

Figure 10:
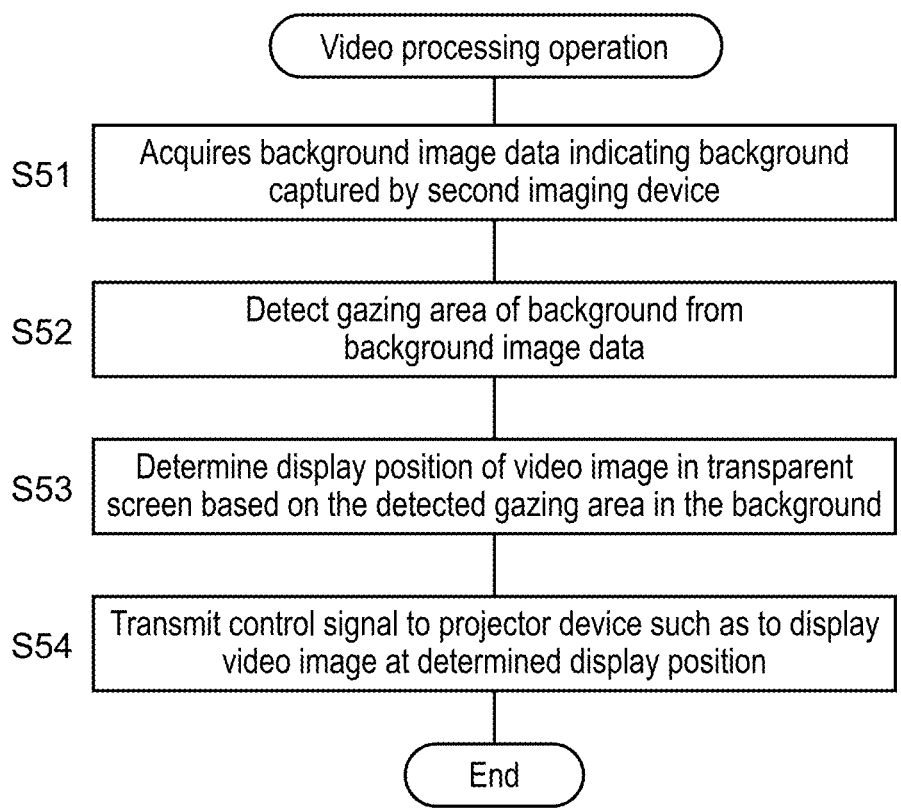
FIG. 10 is a flowchart illustrating a video processing operation performed by a video processing device according to a fifth exemplary embodiment.

Hereinbelow, the operation of video processing device 30 according to the fifth exemplary embodiment will be described with reference to FIGS. 10, 11, and 9. FIG. 10 is a flowchart illustrating a video processing operation performed by video processing device 30 according to the fifth exemplary embodiment.

First, second imaging device 22 directly captures the background of transparent screen 11. Next, as illustrated in FIG. 10, control unit 34 of video processing device 30 acquires the background image data indicating the background behind transparent screen 11 that is captured by second imaging device 22 (S51). Next, control unit 34 analyzes the luminance and chromaticity of the background from the acquired background image data, and detects the gazing area in the background (S52). In the present exemplary embodiment, the gazing area in the background is the playing field of the soccer stadium.

Next, based on the detected gazing area in the background or the analyzed luminance and chromaticity of the background, control unit 34 determines the display position of the video image in transparent screen 11 so that the video image does not overlap the gazing area in the background in the transparent screen 11 (S53). The following describes a specific example of determination of the display position of a video image.

Figure 11:
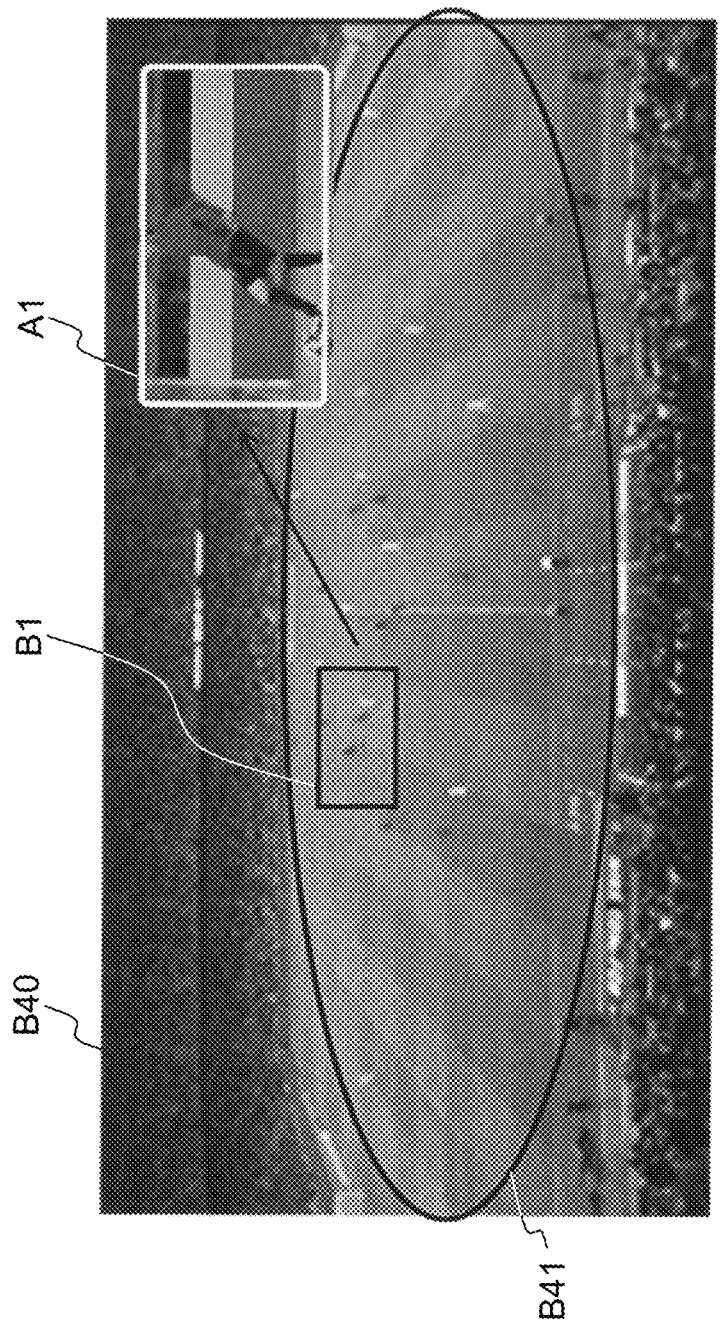
FIG. 11 is a view illustrating an example of a video image displayed on a transparent screen.

FIG. 11 is a view illustrating an example of a video image displayed on transparent screen 11. In the example of FIG. 11, the background of transparent screen 11 is identical to background B40 showing a soccer stadium, which shown in FIG. 9.

As illustrated in FIG. 9 and as described above, control unit 34 analyzes the luminance and chromaticity of background B40 from the acquired background image data, and determines the gazing area in the background that contains a target object at which the viewer is expected to gaze. In the present exemplary embodiments, region B41 of the playing field of the soccer stadium is determined as the gazing area in the background that contains a target object (for example, the playing field of the soccer stadium) at which the viewer is expected to gaze (S52). Then, control unit 34 determines the display position of video image A1 in transparent screen 11 so that video image A1 does not overlap the gazing area in the background, in other words, video image A1 does not overlap region B41 of the playing field of the soccer stadium, as shown in FIG. 11 (S53). It should be noted that control unit 34 may determine, for example, a region with the lowest luminance (region B42 or B43 in FIG. 9) to be the display position, based on the analyzed luminance and chromaticity of the background.

Next, control unit 34 transmits a control signal to projector device 12 such as to display video image A1 at the determined display position (S54). This causes projector device 12 to change the display position according to the control signal.

In the present exemplary embodiment, video image A1 is the enlarged video image of a gazing area in the background that is different from gazing area B41. Specifically, this gazing area in the background is a predetermined area that contains a soccer ball, which has been mentioned earlier. This video image A1, which is the enlarged video image of a gazing position in the background, may be generated, for example, in the following manner.

Control unit 34 detects a soccer ball from the background indicated by the background image data, and determines a predetermined area containing the soccer ball to be gazing area B1 in the background. Then, control unit 34 generates an enlarge video image obtained by enlarging this gazing area B1 as video image A1 to be displayed on transparent screen 11. This makes it possible to highlight gazing position B1. At this time, if the background is in a dark color, such as black, at the display position of video image A1, which is determined based on the luminance and chromaticity of the background analyzed by control unit 34 at step S53, it is possible to perform a video conversion process of outlining video image A1 with a bright color, such as white.

Thus, with video display system 1 according to the present exemplary embodiment, gazing area B41 that contains a target object at which the viewer is expected to gaze is detected first. Next, based on the detected gazing area B41, control unit 34 determines the display position of video image A1 so that video image A1, which is the enlarged video image of another gazing area, does not overlap gazing area B41 in transparent screen 11. This makes it possible to prevent degradation of visibility of the background viewed through transparent screen 11 that occurs due to the overlap of the background and the video image in transparent screen 11.

Sixth Exemplary Embodiment

In the fifth exemplary embodiment, the display position of the video image is determined based on the gazing area in the background (for example, the playing field of a soccer stadium). In the sixth exemplary embodiment, the display position of the video image is determined based on the position of the viewer and the gazing position of the viewer.

The configuration of video display system 1 according to the sixth exemplary embodiment is fundamentally the same as that of the first exemplary embodiment, which has been described with reference to FIGS. 1 and 2, but the functions and operations of control unit 34 of video processing device 30 are different from those described previously. Note that video display system 1 according to the sixth exemplary embodiment determines the display position of the video image based on an output of detection device 23.

Hereinbelow, the operation of video processing device 30 according to the sixth exemplary embodiment will be described with reference to FIGS. 12, 13A, and 13B. FIG. 12 is a flowchart illustrating a video processing operation performed by video processing device 30 according to the sixth exemplary embodiment.

As illustrated in FIG. 12, control unit 34 of video processing device 30 transmits, to projector device 12, the video signal indicating the original video image, which is stored in memory storage unit 33 (S61). This allows projector device 12 to generate projection light based on the video signal and to project the projection light onto transparent screen 11. Detection device 23 detects the position of the viewer who observes the background and the video image displayed on this transparent screen 11 and the gazing position of the viewer. Next, control unit 34 acquires the position of the viewer and the gazing position of the viewer that have been detected by detection device 23 (S62). Next, control unit 34 determines the display position of the video image in transparent screen 11 based on the position of the viewer and the gazing position of the viewer (S63). For example, control unit 34 determines the display position of the video image so that the viewer can see the background easily when the viewer gazes at the background, or on the other hand, the viewer can see the video image easily when the viewer gazes at the video image. Next, control unit 34 transmits a control signal to projector device 12 such as to display the video image at the determined display position (S64). The following describes a specific example of determination of the display position of a video image.

Figure 13B:
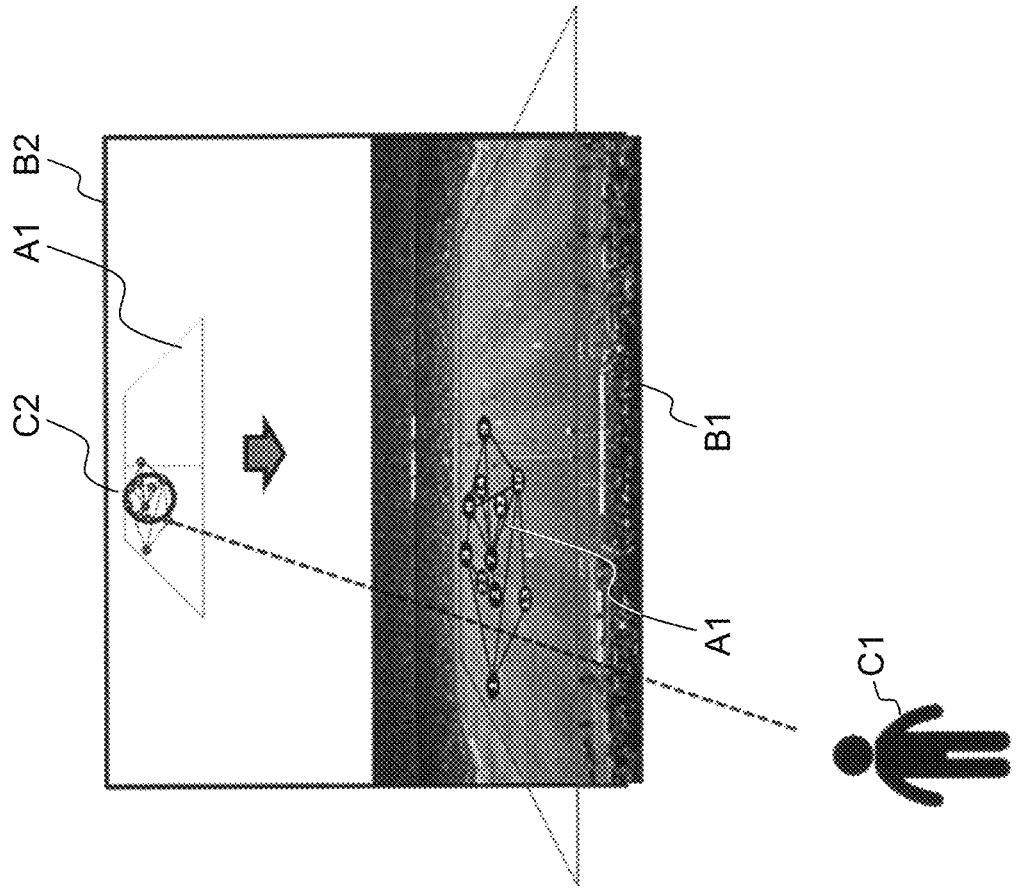
FIG. 13B is a view for illustrating another example of the determination operation for the display position of the video image that is performed by the video processing device according to the sixth exemplary embodiment.
Figure 13A:
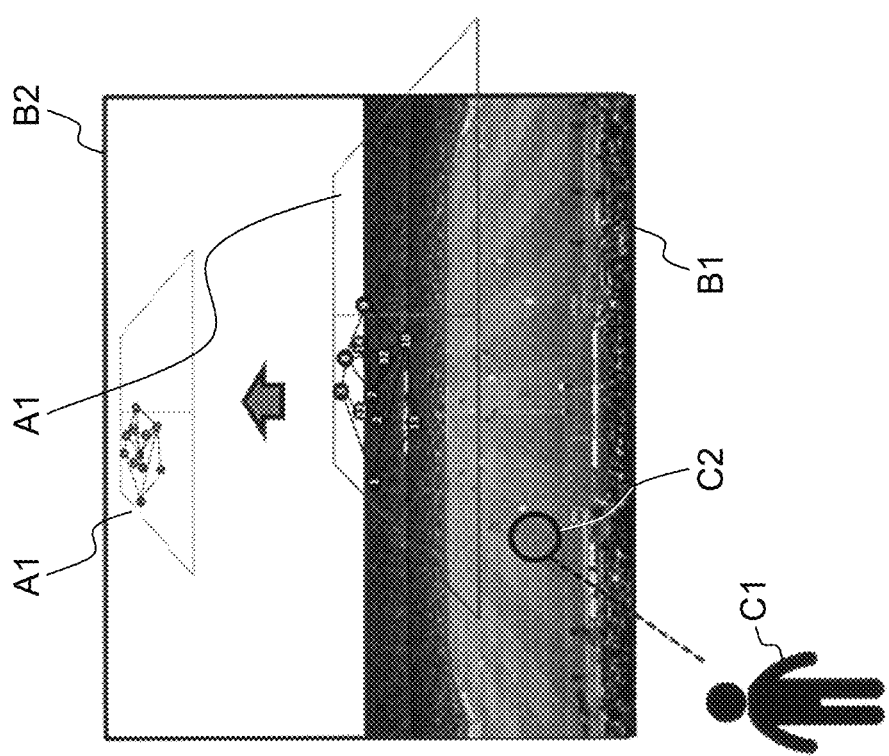
FIG. 13A is a view for illustrating an example of a determination operation for a display position of a video image that is performed by the video processing device according to the sixth exemplary embodiment.

FIGS. 13A and 13B are views for illustrating an example of the operation to determine the display position of the video image that is performed by video processing device 30 according to the sixth exemplary embodiment. In the example illustrated in FIGS. 13A and 13B, background B1 of transparent screen 11 shows a soccer stadium, and video image A1 projected onto transparent screen 11 by projector device 12 shows information indicating the uniform numbers of the players (information on a target object in the background) (banner display).

In the example shown in FIG. 13A, video image A1 is initially displayed above background B1 in transparent screen 11. In this case, viewer C1 is close to transparent screen 11 within a predetermined distance, and gazing position C2 of viewer C1 is within background B1. Therefore, control unit 34 determines the display position of video image A1 to be, for example, in information display part B2 provided above transparent screen 11 so as to allow viewer C1 to view background B1 easily (S63). Then, control unit 34 controls projector device 12 so as to move video image A1 to the determined display position (S64). It is also possible that control unit 34 may determine the display position of video image A1 to be below or beside transparent screen 11. In this case, control unit 34 may control projector device 12 so as to reduce the size of video image A1. Thus, projector device 12 changes the display position of video image A1 according to the control signal.

On the other hand, in FIG. 13B, viewer C1 is not within a predetermined distance close to transparent screen 11, and gazing position C2 of viewer C1 is within video image A1 in information display part B2 above transparent screen 11. Therefore, control unit 34 determines the display position and enlargement display size of video image A1 so as to allow video image A1 to be displayed over the entire area of transparent screen 11 (for example, over the entire area of the playing field of the soccer stadium) so that viewer C1 can view video image A1 easily (S63). Then, control unit 34 controls projector device 12 to cause video image A1 to move to the determined display position and to be displayed in an enlarged size (S64). Thus, projector device 12 changes the display position of video image A1 according to the control signal.

When there are a plurality of viewers C1, it is possible to employ the position of the center of gravity of the plurality of viewers C1 as the above-described position of viewer C1. It is also possible to change the display position of video image A1 every predetermined time based on a plurality of gazing positions C2 of the plurality of viewers C1.

Thus, with video display system 1 according to the present exemplary embodiment, the position of viewer C1 and gazing position C2 of viewer C1 are detected first. Next, control unit 34 determines the display position of video image A1 in transparent screen 11 based on the detected position of viewer C1 and the detected gazing position C2 of viewer C1. With this configuration, when viewer C1 gazes at background B1 of transparent screen 11, control unit 34 determines the display position of video image A1 in transparent screen 11 so that video image A1 does not overlap background B1 (see FIG. 13A). This prevents degradation of visibility of the background of transparent screen 11 that occurs due to the overlap of the background and the video image in transparent screen 11.

On the other hand, when viewer C1 gazes at video image A1, control unit 34 determines the display position of video image A1 in transparent screen 11 so that video image A1 overlaps background B1 (see FIG. 13B). This enables the viewer to simultaneously view both video image A1 and background B1.

Seventh Exemplary Embodiment

The sixth exemplary embodiment prevents a video image from overlapping the background when the viewer is close to transparent screen 11 and also the gazing position of the viewer is in the background. The seventh exemplary embodiment allows the video image to overlap the background when the viewer is close to transparent screen 11.

Furthermore, the seventh exemplary embodiment allows an additional video image to be displayed near the gazing position of the viewer.

The configuration of video display system 1 according to the seventh exemplary embodiment is fundamentally the same as that of the first exemplary embodiment, which has been described with reference to FIGS. 1 and 2, but the functions and operations of control unit 34 of video processing device 30 are different from those described previously. Note that video display system 1 according to the seventh exemplary embodiment determines the display position of the video image based on an output of second imaging device 22 and an output of detection device 23.

Hereinbelow, the operation of video processing device 30 according to the seventh exemplary embodiment will be described with reference to FIGS. 14 and 15. FIG. 14 is a flowchart illustrating a video processing operation performed by video processing device 30 according to the seventh exemplary embodiment.

As illustrated in FIG. 14, control unit 34 of video processing device 30 transmits, to projector device 12, the video signal indicating the original video image, which is stored in memory storage unit 33 (S71). This allows projector device 12 to generate projection light based on the video signal and to project the projection light onto transparent screen 11. Detection device 23 detects the position of the viewer who observes the background and the video image displayed on this transparent screen 11 and the gazing position of the viewer. In addition, second imaging device 22 captures the background of transparent screen 11.

Next, control unit 34 acquires the background image data indicating the background captured by second imaging device 22 (S72). Next, control unit 34 analyzes the luminance and chromaticity of the background from the acquired background image data, and detects the above-described gazing area in the background (S73). In addition, control unit 34 acquires the position of the viewer and the gazing position of the viewer that have been detected by detection device 23 (S74). Next, control unit 34 determines the display position of the video image in transparent screen 11 based on the gazing area in the background, the position of the viewer, and the gazing position of the viewer that have been detected (S75). For example, control unit 34 determines the display position of the video image so that the viewer can see the background easily. Next, control unit 34 transmits a control signal to projector device 12 such as to display the video image at the determined display position (S76). The following describes a specific example of determination of the display position of a video image.

FIG. 15 is a view for illustrating an example of a determination operation for a display position of a video image that is performed by video processing device 30. In the example of FIG. 15 as well as the examples of FIGS. 13A and 13B, background B1 of transparent screen 11 shows a soccer stadium, and video image A1 projected on transparent screen 11 by projector device 12 shows the information indicating the uniform numbers of the players.

As illustrated in FIG. 15, when viewer C1 comes close to transparent screen 11 within a predetermined distance, control unit 34 determines the display position and enlargement display size of video image A1 so as to allow video image A1 to be displayed over the entire area of transparent screen 11 (for example, over the entire area of the playing field of the soccer stadium), which is the gazing area in background (S75). Then, control unit 34 controls projector device 12 to cause video image A1 to move to the determined display position and to be displayed in an enlarged size (S76). Thus, projector device 12 changes the display position of video image A1 according to the control signal, so that video image A1 is overlapped and displayed over the entire area of the playing field of the soccer stadium.

Also, when viewer C1 gazes at gazing position C2 that contains a particular player (target object) at step S75, control unit 34 generates enlarged image (additional image) A2, which is obtained by enlarging the image within a predetermined area containing gazing position C2 of viewer C1. Note that enlarged image A2 is generated from the background image data from second imaging device 22. Then, control unit 34 determines the display position of this enlarged video image A2 to be near gazing position C2 of viewer C1. Then, at step S76, control unit 34 controls projector device 12 so as to display enlarged video image A2 at the determined display position. This allows projector device 12 to display enlarged video image A2 at the display position determined according to the control signal, so that enlarged video image A2 is displayed near gazing position C2 of viewer C1. At this time, it is also possible to perform the video conversion process of outlining enlarged video image A2 with a bright color, such as white, based on the analyzed luminance and chromaticity of the background, as described earlier.

Thus, video display system 1 according to the present exemplary embodiment detects the position of viewer C1 and the gazing area in the background (for example, the playing field of a soccer stadium). Then, when viewer C1 comes close to transparent screen 11, control unit 34 determines the display position of video image A1 in transparent screen 11 so that video image A1 overlaps the entire area of the playing field of the soccer stadium, for example, which is the gazing area in the background. This enables the viewer to simultaneously observe both the players in background B1 and player information in video image A1.

Furthermore, video display system 1 according to the seventh exemplary embodiment detects gazing position C2 of viewer C1 and determines the display position of enlarged video image A2 in transparent screen 11 so that enlarged video image (additional video image) A2 of a predetermined area containing this gazing position C2 is displayed near gazing position C2. This enables the viewer to observe, for example, enlarged video image A2 showing the player at which viewer C1 gazes also at the same time.

In the fifth exemplary embodiment, the display position of the video image on transparent screen 11 is determined based on the gazing area in the background. In the sixth exemplary embodiment, the display position of the video image on transparent screen 11 is determined based on the position of the viewer and the gazing position of the viewer. In contrast, as in the seventh exemplary embodiment, it is also possible to determine the display position of the video image based on both the gazing area in the background, and the position of the viewer and the gazing position of the viewer.

Other Exemplary Embodiments

Hereinabove, the first to seventh exemplary embodiments have been described as an example of the technology disclosed in the present application. However, the technology of the present disclosure is not limited thereto and may be applied to other embodiments in which modifications, substitutions, additions, and subtractions are made. Moreover, it is also possible to construct other embodiments by combining various component parts illustrated in the first to seventh exemplary embodiments described above. Now, other exemplary embodiments will be illustrated in the following.

(1) The exemplary embodiments have illustrated transparent screen 11 and projector device 12 as an example of the display device that displays a video image indicated by a video signal and allows a background to transmit therethrough. However, the display device may be a transparent electroluminescent display device of self-luminous-type or a transparent liquid crystal display device, for example. In this case, second communication unit 32 performs data communication with these display devices.

(2) In the present exemplary embodiments, second imaging device 22 and control unit 34 work together to detect a gazing area in the background, which contains a target object at which the viewer is expected to gaze, such as the playing field or a ball in a soccer stadium. However, it is also possible that second imaging device 22 may have the function to detect the gazing area in the background by itself.

Hereinabove, exemplary embodiments have been described as examples of the technology of the present disclosure. For that purpose, the appended drawings and the detailed description have been provided.

Accordingly, the elements shown in the appended drawings and the detailed description may include not only the elements that are essential to solve the technical problem but also non-essential elements that are not necessary to solve the technical problem. Therefore, just because the appended drawings and the detailed description contain such non-essential elements, it should not be construed that such non-essential elements are necessary.

Moreover, the foregoing exemplary embodiments merely illustrate the technology of the present disclosure, and therefore, various modifications, substitutions, additions, and subtractions may be made within the scope of the claims and equivalents thereof.

INDUSTRIAL APPLICABILITY

The present disclosure is applicable to a video display system that allows a viewer to simultaneously observe both a video image displayed on a transparent display device and a background of the display device.

REFERENCE MARKS IN THE DRAWINGS

1 video display system
10 display device
11 transparent screen
12 projector device
21 first imaging device
22 second imaging device
23 detection device
30 video processing device
31 first communication unit
32 second communication unit
33 memory storage unit
34 control unit

The invention claimed is:

1. A video display system comprising:
    a display device displaying a display video image containing a transmitted background and a video image indicated by a video signal;
    a video processing device converting, based on a characteristic related to the transmitted background, the video image indicated by the video signal to be transmitted to the display device; and
    a first imaging device capturing the display video image displayed on the display device,
    wherein the video processing device analyzes a luminance and a chromaticity of the display video image captured by the first imaging device, the display video image containing the transmitted background and the video image indicated by the video signal,
    wherein the video processing device analyzes a luminance and a chromaticity of the video signal, and
    the video processing device converts the luminance and the chromaticity of the video signal based on a comparison of (i) a result of the analysis of the luminance and the chromaticity of the display video image captured by the first imaging device, the display video image containing the transmitted background and the video image indicated by the video signal and (ii) a result of the analysis of the luminance and the chromaticity of the video signal.

2. The video display system according to claim 1, wherein the characteristic related to the transmitted background is a characteristic of the transmitted background contained in the display video image.

3. The video display system according to claim 1, further comprising:
    a second imaging device capturing the background;
    wherein the video processing device analyzes a luminance and a chromaticity of the background captured by the second imaging device and converts a luminance and a chromaticity of the video image indicated by the video signal based on a result of the analysis.

4. The video display system according to claim 1, wherein the video processing device extracts a character from the video image indicated by the video signal, and performs conversion of the character so as to improve visibility of the video image when displayed on the display device.

5. The video display system according to claim 4, wherein the conversion of the character is an outlining process of the character or a font conversion process of the character.

6. The video display system according to claim 1, wherein the video processing device extracts a still image of a human or an animal from the video image indicated by the video signal, and performs conversion of the still image so as to improve visibility of the video image when displayed on the display device.

7. The video display system according to claim 6, wherein the conversion of the still image is an outlining process of the still image.

8. The video display system according to claim 1, wherein:
    the display device comprises:
    a transparent screen diffuse-reflecting a portion of incident light off a main surface of the transparent screen and transmitting a portion of the incident light through the main surface; and
    a projector device projecting the video image onto the screen.

9. The video display system according to claim 1, wherein the display device is a transparent electroluminescent display device or a transparent liquid crystal display device.

* * * * *